Feb. 13, 1973 N. L. ROTAST 3,716,761

UNIVERSAL INTERCONNECTION STRUCTURE FOR MICROELECTRONIC DEVICES

Filed May 3, 1972 11 Sheets-Sheet 2

Feb. 13, 1973 N. L. ROTAST 3,716,761

UNIVERSAL INTERCONNECTION STRUCTURE
FOR MICROELECTRONIC DEVICES

Filed May 3, 1972 11 Sheets-Sheet 3

Feb. 13, 1973 N. L. ROTAST 3,716,761

UNIVERSAL INTERCONNECTION STRUCTURE FOR MICROELECTRONIC DEVICES

Filed May 3, 1972 11 Sheets-Sheet 9

United States Patent Office 3,716,761

Patented Feb. 13, 1973

3,716,761

UNIVERSAL INTERCONNECTION STRUCTURE FOR MICROELECTRONIC DEVICES

Nikita L. Rotast, Ottawa, Ontario, Canada, assignor to Microsystems International Limited, Montreal, Quebec, Canada Filed May 3, 1972, Ser. No. 249,833
Int. Cl. H05k *1/04*
U.S. Cl. 317—101 B 12 Claims

ABSTRACT OF THE DISCLOSURE

The invention relates to a lead structure—particularly a beam-lead frame or pattern deposited upon a substrate—which will accommodate devices having shapes and contact configurations according to a given standard. For example, in one embodiment of the invention, the lead structure will accommodate all devices formed according to the EIA JC11.4 standard. The structure is not limited to triangular or rectangular devices but may be patterned to accommodate families of polygonal chips having any number of sides, providing all chips to be accommodated by any given pattern according to the invention comply with certain defined standards.

The present invention relates to a lead structure adapted to accommodate integrated circuit chips having configurations and contact spacings conforming to given standards.

There has been recognized in the semiconductor industry the need for some kind of "universal" lead frame or lead structure which will accept chips of varying sizes and varying contact configurations, such devices being produced according to given predetermined standards to which the lead structure would also be produced. To my knowledge, efforts to produce such structures have not been entirely successful.

The structure according to my invention can be made to accommodate chips of any standard configuration and, although the most conventional chip shape is, of course, rectangular or square, structures according to my invention may be produced to accommodate chips of rectangular, trapezoidal, triangular or indeed of any symmetrical or unsymmetrical polygonal shape. For any given frame according to the invention, however, it is required that the chip to be accommodated thereby conform to a predetermined standard as to chip shape and contact spacing.

The invention may be defined in its most general form as an interconnection structure adapted to accommodate in electrical interconnection therewith substantially planar polygonal devices having $n$ sides subtending angles $q_1$, $q_2 \ldots q_n$, the first and second sides subtending an angle $q_1$, the second and third sides subtending an angle $q_2 \ldots$ and the $n$th side and the first side subtending an angle $q_n$, at least said first and second sides having contacts therealong, the first said side having said contacts at center-to-center spacings of $s_1$ units or multiples thereof, the second adjacent said side having said contacts at center-to-center spacings of $s_2$ units or multiples thereof . . . and the $n$th said side having said contacts at center-to-center spacings of $s_n$ units or multiples thereof, said interconnection structure comprising $n$ coplanar conductor sets, each said conductor set comprising a plurality of coplanar parallel conductors, each said conductor having inner and outer ends, and where the number of conductor sets is two, the locus of said inner ends of each said set being a generally straight line, the locus of said inner ends of the first said conductor set being generally parallel to and adjacent the locus of the inner ends of the second said conductor set, and where the number of conductor sets is three or more, the loci of said inner ends of the first said conductor set forming first and second generally straight lines, the loci of said inner ends of the second said conductor set adjacent the first said conductor set forming third and fourth generally straight lines, said second and third generally straight lines being generally parallel and coadjacent . . . and the loci of said inner ends of the $n$th said conductor set adjacent the first said conductor set designated respectively locus number $(2n-1)$ and locus number $2n$ each forming a generally straight line, locus number $2n$ being generally parallel and adjacent said first generally straight line forming a locus of the inner ends of said first conductor set.

the angle subtended by said conductors of said first and second conductor sets being the complementary angle to the angle $q_1$, the angle subtended by said second and third conductor sets being the complementary angle to the angle $q_2 \ldots$ and the angle subtended by said conductors of the $n$th and first conductor sets being the complementary angle to the angle $q_n$.

The invention will now be described further by way of example only and with reference to the accompanying drawings, in which:

FIGS. 1 to 3 inclusive are plan views of lead structures according to various embodiments of the invention;

Figures 1, 6:
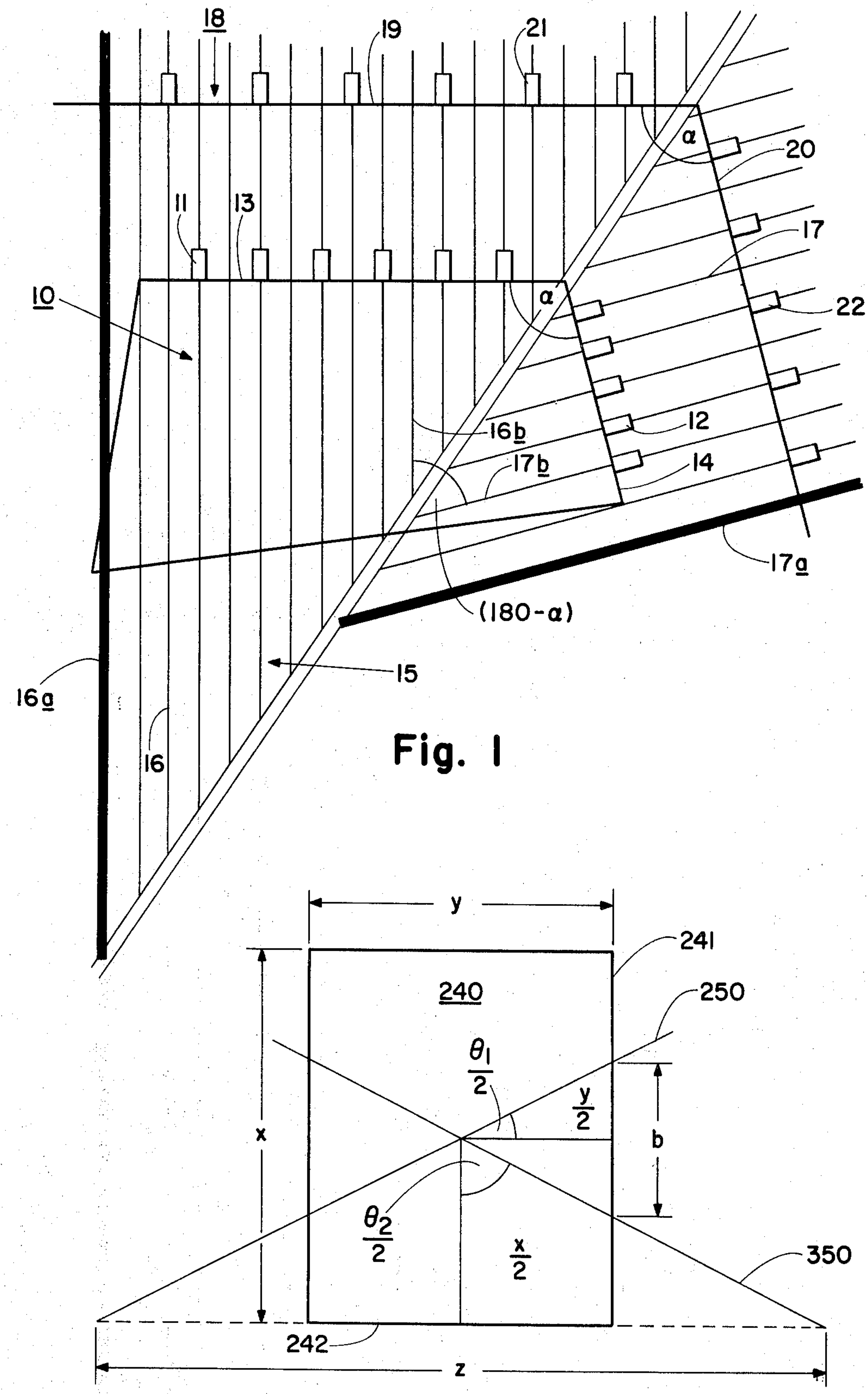
FIG. 6 is a diagrammatic representation of a rectangular chip showing thereon the relationship between chip dimensions, contact location and lead structure loci.

Referring now to FIG. 1 of the drawings, there is schematically shown a chip 10 of trapezoidal shape having contacts 11 and 12 along adjacent sides 13 and 14 thereof respectively. The contacts 11 are center-to-center spaced by 20 mils and the contacts 12 are spaced by 14 mils. The sides 13 and 14 subtend an angle $\alpha$, wherein $\alpha$ is 105°. A lead structure 15 is now provided in accordance with the invention, this structure consisting of two sets of parallel leads 16 and 17 respectively. In practice each lead 16 or 17 would be thick relative to the contacts 11 and 12, but for the sake of clarity, only two leads **16*a* and 17*a* are shown with substantial thickness, the remaining leads being shown schematically by thin lines, such as, for example, leads 16*b* and 17*b*. The angle subtended by the leads of the two sets 16 and 17—such as between leads 16*b* and 17*b*—is the complementary angle to the angle $\alpha$—i.e. $(180-\alpha)$°—which in this example is 75°. Thus, from a consideration of the geometry of the drawings, it will be realized that the chip 10 can be placed upon the lead structure 15 so that the leads 16 subtend right-angles with the side 13 of the chip 10 and the leads 17 subtend right-angles with the side 14. The leads 16 are center-to-center spaced by 10 mils so that alternate leads can align with the contacts 11 on the chip 10. Also the leads 17 are center-to-center spaced by 14 mils so that each lead can align with a contact 12 on the chip 10**.

Still with reference to FIG. 1, consider now a much larger chip 18 having sides 19 and 20 subtending the same angle $\alpha$, i.e. 105°. The side 19 has contacts 21 therealong, the contacts being center-to-center spaced by 30 mils. The side 20 has contacts 22 therealong having center-to-center spacing of 28 mils. Since the spacing of the contacts 21 is exactly three times that of the leads 16 of the lead structure 15, by orienting the chip 18 upon the lead structure with the side 19 subtending right angles with the leads 16, every third lead 16 can be aligned with a contact 21, as can be seen in the drawing. Similiarly, since the spacing of the contacts 22 is exactly twice that of the leads 17, every second lead 17 can be aligned with a contact 22. By consideration of FIG. 1, it will be realized that any size chip within the dimensional confines of the leads structure 15 will fit this structure providing such chip conforms to a standard specifying that the contacts to be aligned with the structure extend from two adjacent sides of the chip, such adjacent sides subtending an angle 105°, and the contacts along a first of the sides being spaced at 10 mils centers or multiples thereof, and the contacts along the second of the sides being spaced at 14 mils centers or multiples thereof.

Figure 2:
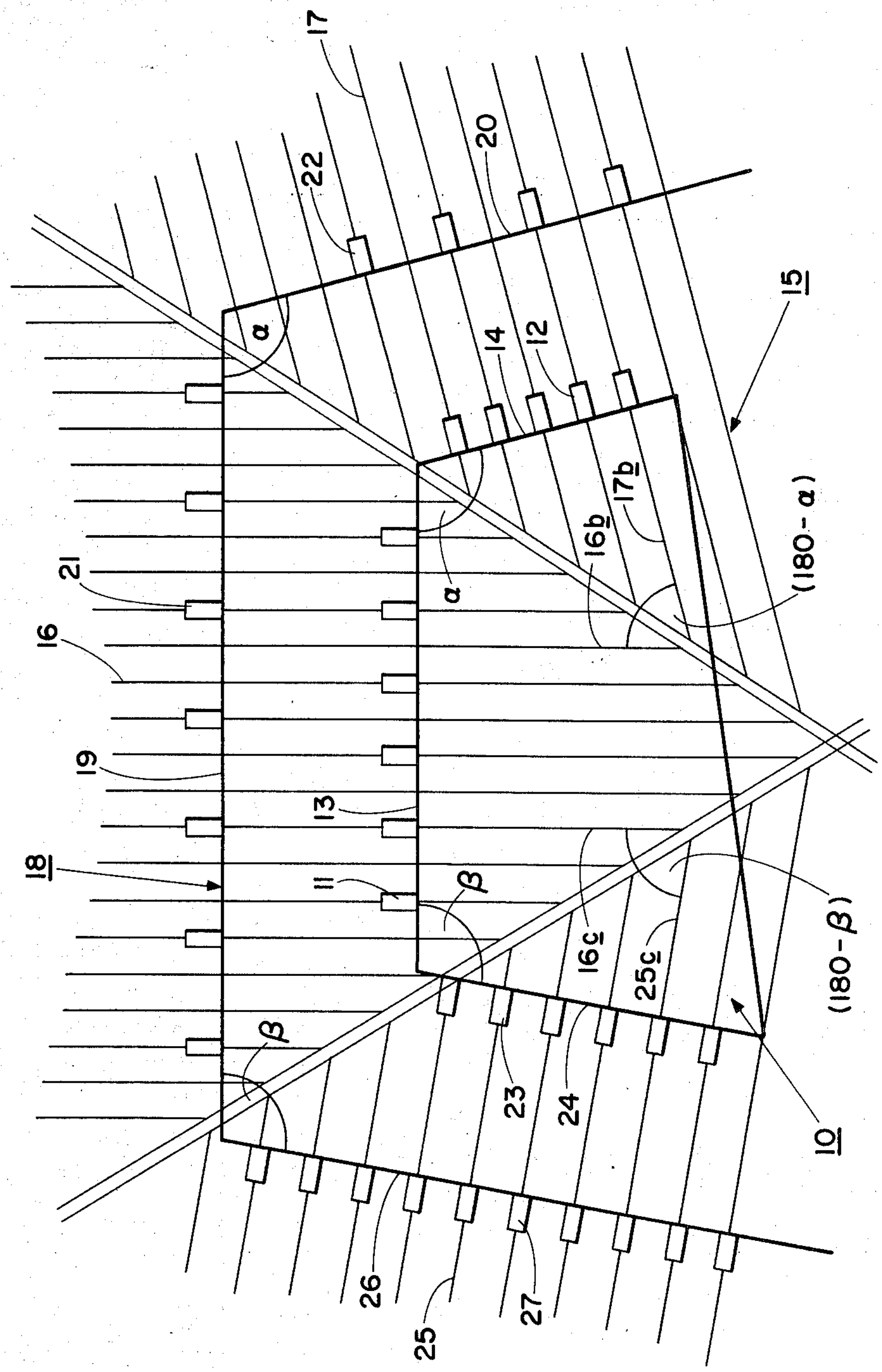

Referring now to FIG. 2 of the drawings, there is shown the same chip 10 as is shown in FIG. 1, but in this case, the chip has contacts 23 extending from a third side 24. The side 24 is adjacent the side 13 and subtends therewith an angle $\beta$, wherein $\beta$ is 100°. The contacts 23 are center-to-center spaced by 16 mils. The lead structure 15 now requires a third set of parallel leads 25 in order to accommodate the contacts 23. The leads 25 are center-to-center spaced by 16 mils and subtend an angle $(180-\beta)°$ with the leads 16—see, for example, the angle between the leads 16c and 25c. This angle is the complementary angle to the angle $\beta$ and is therefore 80°. Since the side 13 of the chip 10 is oriented at 90° to the leads 16, as explained with reference to FIG. 1, it will be realized that the leads 25 will subtend right-angles with the sides 24. Since the center-to-center spacing of the contacts 23 is the same as the spacing of the leads 25, clearly the contacts 23 can now be aligned with the leads 25.

Consider again now the larger chip 18 with a third side 26 having contacts 27 therealong at center-to-center spacings of 16 mils. The side 26 subtends the angle $\beta$—i.e., 100°—with the side 19 of the chip 18. Since the spacing of the leads 25 is equal to the spacing of the contacts 27, each contact 27 can be aligned with a lead 25. Now it will be realized that the lead structure 15 will accommodate any chip conforming to the standard specified in connection with FIG. 1—and also subject to the qualification explained hereinafter in connection with FIG. 4—and will also accommodate chips conforming to such standard and also having a third side having contacts therealong at a center-to-center spacing of 16 mils or multiples thereof, such third side subtending an angle of 100° with the adjacent first side.

Figure 3:
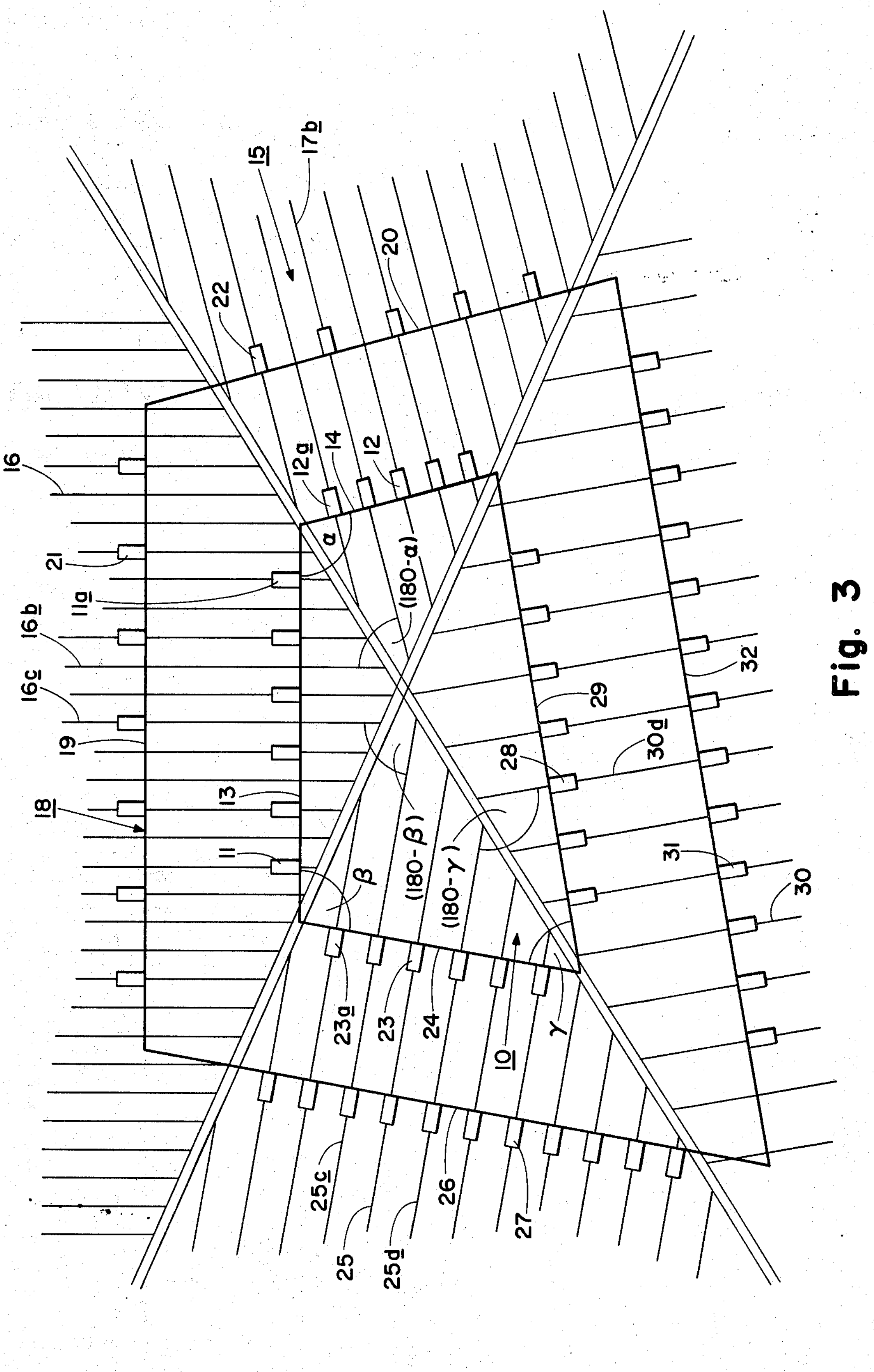

Referring now to FIG. 3 of the drawings, there is shown the same chip 10 as is shown in FIGS. 1 and 2, but in this case, the chip has contacts 28 extending from its fourth side 29. The side 29 subtends an angle $\gamma$ with the side 24, wherein $\gamma$ is 70°. The contacts 28 are center-to-center spaced by 20 mils. The lead structure 15 now requires a fourth set of parallel leads 30 in order to accommodate the contacts 28. The leads 30 are center-to-center spaced by 20 mils and subtend an angle $(180-\gamma)°$ with the leads 25—see for example the angle between the leads **25*d* and 30*d*. This angle is the complementary angle to the angle $\gamma$ and is therefore 110°. Since the side 24 of the chip 10 is oriented at 90° to the leads 25, as explained in connection with FIG. 2, it will be clear from a consideration of FIG. 3 that the leads 30 must subtend right-angles with the side 29. Now, since the center-to-center spacing of the contacts 28 is the same as the spacing of the leads 30, the contacts 28 and the leads 30** can be aligned.

Considering once again the larger chip 18 discussed with reference to FIGS. 1 and 2, it will be seen in FIG. 3 that a fourth row of contacts 31 is provided along its fourth side 32. The contacts 31 are center-to-center spaced by 20 mils. The side 32 subtends the same angle $(180-\gamma)°$—i.e., 70°—with the side 26 of the chip 18. Since the spacing of the contacts 31 is the same as the spacing of the leads 30, each contact 31 can now be aligned with a lead 30. Now it will be realized that the lead structure will accommodate any chip conforming to the standards specified in connection with FIGS. 1 and 2 or to chips conforming to such standards and further having a fourth side having contacts therealong at a center-to-center spacing of 20 mils or multiples thereof, such fourth side subtending with the adjacent third side an angle of 70°. This standard again is subject to the qualification noted above in connection with FIG. 3 and which is explained as follows by reference to FIG. 4.

Figure 4:
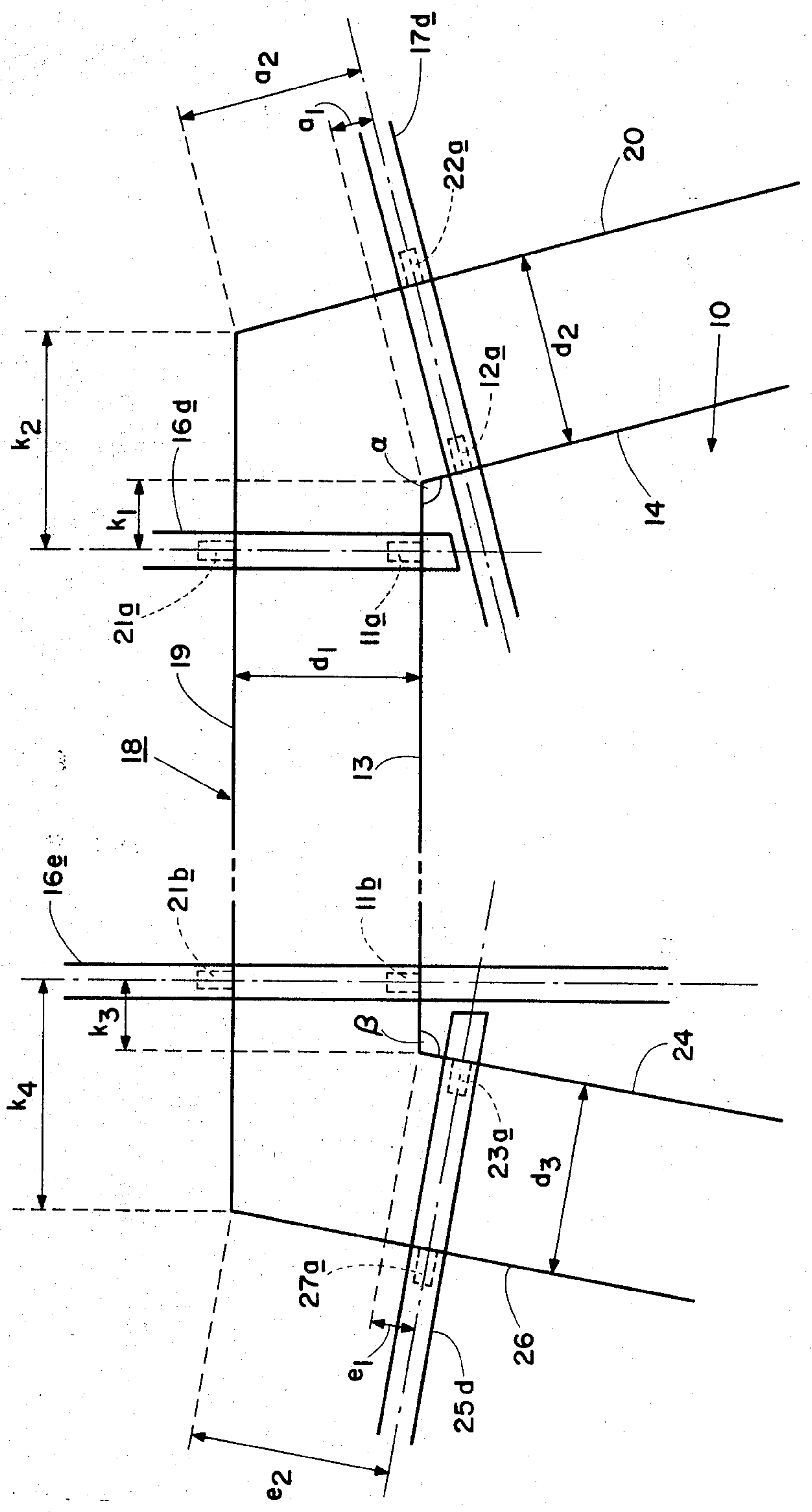
FIG. 4 shows a part of the lead structure of FIG. 3.

Referring now to FIG. 4, consider any contact **12*a* extending from the side 14 of the chip 10 (see also FIG. 3). Also consider any contact 11*a* extending from the side 13 of the chip 10 and any contact 23*a* extending from the side 24 of the chip (see also FIG. 3). Consider also the leads 16*d*, 16*e*, 17*d* and 25*d* with which the contacts 11*a*, 11*b*, 12*a* and 23*a* respectively align and let it be assumed that the center-lines of the respective contacts and leads are in alignment, as shown in FIG. 4. Let the distance between the center-line of the contact 11*a* and the adjacent corner of the chip be $k_1$, the distance between the center-line of the contact 12*a* and the adjacent chip corner of $a_1$, the distance between the center-line of the contact 23*a* and the adjacent chip corner be $e_1$, and the distance between the center-line of the contact 11*b*** and the adjacent chip corner be $k_3$.

Now consider the chip 18 and any two contacts **21*a* and 21*b* extending from the side 19 thereof, any contact 22*a* extending from the side 20 thereof and any contact 27*a* extending from the side 26 thereof. Also the contacts 21*a*, 21*b*, 22*a* and 27*a* are so located along the sides of the chip 18 that their center-lines align with the leads 16*d*, 16*e*, 17*d* and 25*d* respectively. This is the situation which will exist if both chips 15 and 18 conform to the necessary standard to ensure alignment of their contacts with the lead structure 15. The relationships which establish this standard may be calculated as follows. Let the distance from the center-line of contact 27*a* to the adjacent corner of the chip 18 be $e_2$, the distance from the contact 21*b* to the adjacent corner be $k_4$, the distance from the contact 21*a* to the adjacent corner be $k_2$ and the distance from the contact 22*a* to the adjacent corner be $a_2$. The spacings between the sides 13, 14 and 24 of the chip 10 and the sides 19, 20 and 26 of the chip 18** are $d_1$, $d_2$ and $d_3$ respectively.

It may be shown that:

Equation 1

$$(k_2-k_1)^2+d_1^2=(a_2-a_1)^2+d_2^2$$

It may also be shown that:

Equation 2

$$(k_4-k_3)^2+d_1^2=(e_2-e_1)^2+d_3^2$$

Substracting Equation 1 from Equation 2, we find,

Equation 3

$$(k_2-k_1)^2-(k_4-k_3)^2=(a_2-a_1)^2-(e_2-e_1)^2+d_2^2-d_3^2$$

Now,

Equation 4

$$d_3=(k_4-k_3).\sin.(\beta)+d_1.\cos.(\beta)$$

Also,

Equation 5

$$d_2=(k_2-k_1).\sin.(\alpha)+d_1 \cos.(\alpha)$$

Substituting Equations 4 and 5 in Equation 3, we find,

Equation 6

$$(k_2-k_1)^2-(k_4-k_3)^2=(a_2-a_1)^2-(e_2-e_1)^2+[(k_2-k_1) \sin.\alpha+d_1 \cos.\alpha]^2-[(k_4-k_3) \sin.\beta+d_1 \cos.\beta]^2$$

Equation 7

$$\therefore (k_2-k_1)^2+(e_2-e_1)^2+[(k_4-k_3) \sin.\beta+d_1 \cos.\beta]^2 =(k_4-k_3)^2+(a_2-a_1)^2+[(k_2-k_1) \sin.a+d_1 \cos.a]^2$$

Therefore, Equation 7 relates the angular displacement between three adjacent sides of the chips 10 and 18 to the location of the contacts along their respective sides relative to their corners for any given lead structure. If the situation is that shown in FIG. 3, wherein all four sides of each chip have contacts therealong, then further similar relationships between the four adjacent sides must be adhered to. These relationships complete the standard which must be specified in respect of all chips, such as those illustrated in FIGS. 2 and 3, which will align with a given lead structure, having lead sets displaced by angles $\alpha$, $\beta$, etc. Taking the example of a chip wherein the angles subtended by the three adjacent sides are each 90°, as in a rectangular chip, a consideration of FIG. 4 shows that in this case $k_2-k_1=d_2$ and $k_4-k_3=d_3$. Also $a_2-a_1=d_1=e_2-e_1$. The equations derived above are obviously satisfied.

Figure 5:
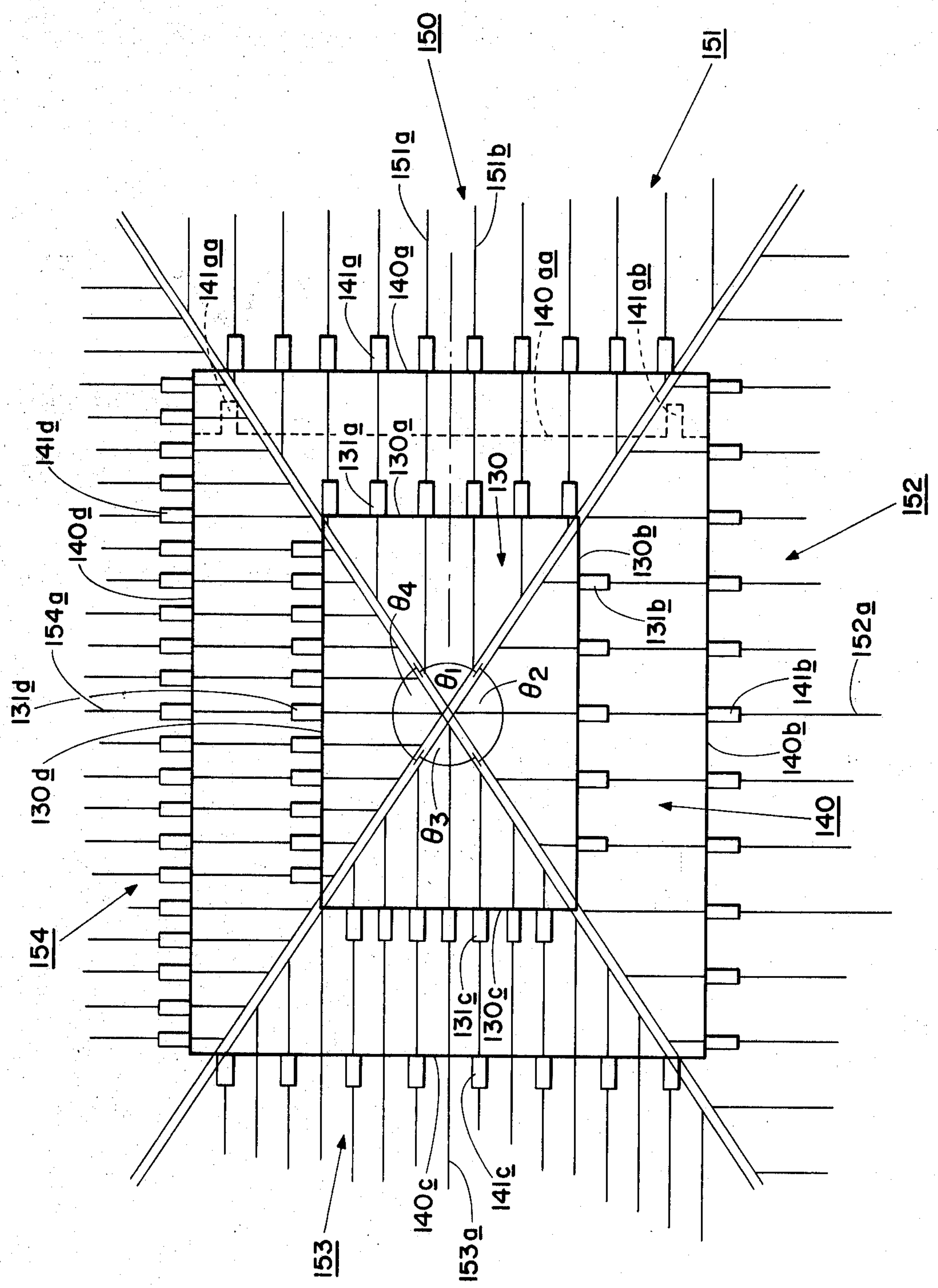
FIG. 5 is a plan view of a lead structure according to a further embodiment of the invention.

The examples of FIGS. 1 to 3 inclusive are clearly unusual and unconventional but are well illustrative of the truly universal nature of the lead structure concept of the present invention insofar as it may be applied to families of chips of any shape providing such chips conform to the standards explained above. To see how this invention relates to conventional shaped chips and how standards may easily be applied to such chips, consider now a rectangular chip 130 as shown in FIG. 5. The chip has sides 130*a*, 130*b*, 130*c* and 130*d*, each such side provided with rows of contacts 131*a*, 131*b*, 131*c* and 131*d* respectively. Contacts 131*a* are center-to-center spaced by 15 mils, contacts 131*b* by 20 mils, and contacts 131*c* and 131*d* by 10 mils. The contact rows are symmetrically spaced about the center points of the sides; for example, side 130*a* has six contacts 131*a* and therefore, since the contact spacing is 15 mils, the two contacts closest to the center line of side 130*a* will be spaced on each side thereof by a distance of 7.5 mils. Each of sides 130*b*, 130*c*, and 130*d* has an odd number of contacts and therefore a contact will coincide with the center line of each side.

Consider now the larger chip 140 in FIG. 5. This chip has sides 140*a*, 140*b*, 140*c* and 140*d* having contacts 141*a*, 141*b*, 141*c* and 141*d* therealong respectively. The contacts 141*a* are center-to-center spaced by 15 mils, contacts 141*b* by 20 mils, contacts 141*c* by 20 mils and contacts 141*d* by 10 mils. The contacts are symmetrically spaced about the center lines of the chip sides. Referring again to FIG. 5, a lead structure 150 according to the general pattern of FIG. 3 can be provided which will satisfy both chips 130 and 140. The lead structure 150 comprises lead sets 151, 152, 153 and 154 respectively, each set containing parallel leads. Leads 151 are spaced by 15 mils, leads 152 are spaced by 20 mils, and leads 153 and 154 are spaced by 10 mils. The loci of the lead ends of the sets are straight lines and the loci of the lead ends of the set 151 subtend an angle $\theta_1$, the loci of the lead ends of the set 152 subtend an angle $\theta_2$, the loci of the lead ends of the set 153 subtend an angle $\theta_3$ and the loci of the lead ends of the set 154 subtend an angle $\theta_4$. Since the lead structure is made to accommodate rectangular chips, the adjacent lead sets are oriented at 90°. Also, a consideration of the geometry of FIG. 5 will quickly reveal that $\theta_1=\theta_3$ and $\theta_2=\theta_4$ and that the sum of the four angles is 360°. Each of the lead sets 152, 153 and 154 is symmetrically disposed about a central lead 152*a*, 153*a* and 154*a* respectively, and the lead set 151 is symmetrically disposed about leads 151*a* and 151*b* as shown in FIG. 5. Now, the center line of each of sides 130*b*, 130*c* and 130*d* can be lined up with the leads 152*a*, 153*a* and 154*a* respectively. Since a contact is located upon the center line of each these three sides, the contacts along these sides are in alignment with a lead of the lead structure. Also, since the contacts along the side 130*a* of the chip are symmetrically disposed about the center line of the chip side with the two contacts closest to the center spaced in each side of the center line by half the total spacing of the contacts, each of the contacts along the side 130*a* will register with a lead 151*a*, 151*b* as shown in FIG. 5. A further consideration of FIG. 5 now shows that the larger chip 140 will also register upon the lead structure 150. Let us examine the relationships between the chips 130 and 140 which enables both chips to register with the lead structure 150.

For the sake of simplicity, let it be assumed that each chip has the maximum possible number of contacts along each side which can be accommodated with the given spacings, without contacts actually located at corners of the chips. Side 130*a* of chip 130 has six contacts 131*a* therealong at spacings of 15 mils. Side 140*a* of chip 140 has ten contacts 141*a* spaced therealong at spacings of 15 mils. Since each side 130*a* and 140*a* contains an even number of contacts symmetrically spaced about the center line of the respective side, the third and fourth contacts 131*a* along the side 130*a* can be registered with the center leads 151*a* and 151*b* of the lead set 151, as can the fifth and sixth contacts 141*a* of the side 140*a*. Considering the corresponding sides 130*b* and 140*b*, the side 130*b* has five contacts 131*b*, the third contact lying in the center line of the side 130*b* and the side 140*b* has eleven contacts, the sixth lying in the center line of the side 140*b*. Since each side 130*b* and 140*b* has an odd number of contacts, symmetrically spaced about the center line of the respective side, the third contact 131*b* of the side 130*b* can be registered with the center lead 152*a* of the lead set 152 as can the sixth contact 141*b* of the side 140*b*.

FIG. 5 shows the positions upon the lead structure 150 whereat the chips 130 and 140 must be placed in order to align the contacts thereupon with the appropriate leads of the structure 150. Suppose now the sides 140*b* and 140*d* of the chip 140 were shorter, thus bringing the side 140*a* to the location indicated by the broken line 140*aa*, the remaining sides of the chips being located as before. Now the outer contacts 141*a* of the side 140*a* will adopt the positions indicated by the broken lines 141*aa* and 141*ab* respectively. It will be seen that in these positions the outermost contacts on the side 140*a* will no longer align with the leads of the lead set 151 and therefore these contacts cannot be accommodated (it is assumed here that the contacts in the positions 141*aa* and 141*ab* are not sufficiently elongated to reach their respective leads 151—indeed for the purposes of explanation at this point, it should be assumed that the contact points lie along the chip sides and not extended therefrom). Therefore, it is necessary to establish a relationship between chip dimensions and the number of contacts on each side thereof which can be accommodated by the lead structure 150.

To establish this relationship, consider FIG. 6, which shows a rectangular chip 240 having sides 241 and 242 of length $x$ and $y$ respectively, located symmetrically upon a lead structure, the loci of whose lead ends are shown as 250 and 350, respectively. As in FIG. 5, these loci subtend angles $\theta_1$, $\theta_2$, $\theta_3$, and $\theta_4$. The loci intersect the side 241 and contain a length $b$ between the intersection points. The loci do not intersect the side 242 but extending this side by broken lines, as shown in FIG. 6, the intersection points of the loci with such lines now contains a length $z$. From a consideration of the geometry of FIG. 6, it will be seen that:

$$b=y \tan \theta_1/2 \qquad \text{Equation 8}$$

Also:

$$z=x \tan \theta_2/2 \qquad \text{Equation 9}$$

Since both $b$ and $z$ are directly related to the number of contacts which can be accommodated, this clearly means that for the chip 240, only a small portion of the side 241 can be used for contact placement whilst the full side 242 can be used. In certain circumstances this waste of much of the space along side 241 as contact area is unimportant, but generally, it is desirable that optimum use of the chip sides be used for contact placement. Clearly, such optimization occurs as $x \rightarrow b$, which conversely means that $y \rightarrow z$. In other words, the lead structure 150 of FIG. 5, represented schematically in FIG. 6, is most efficiently used for chips having side dimensions such that $y/x$ equals $\tan \theta_2/2$.

Figure 7:
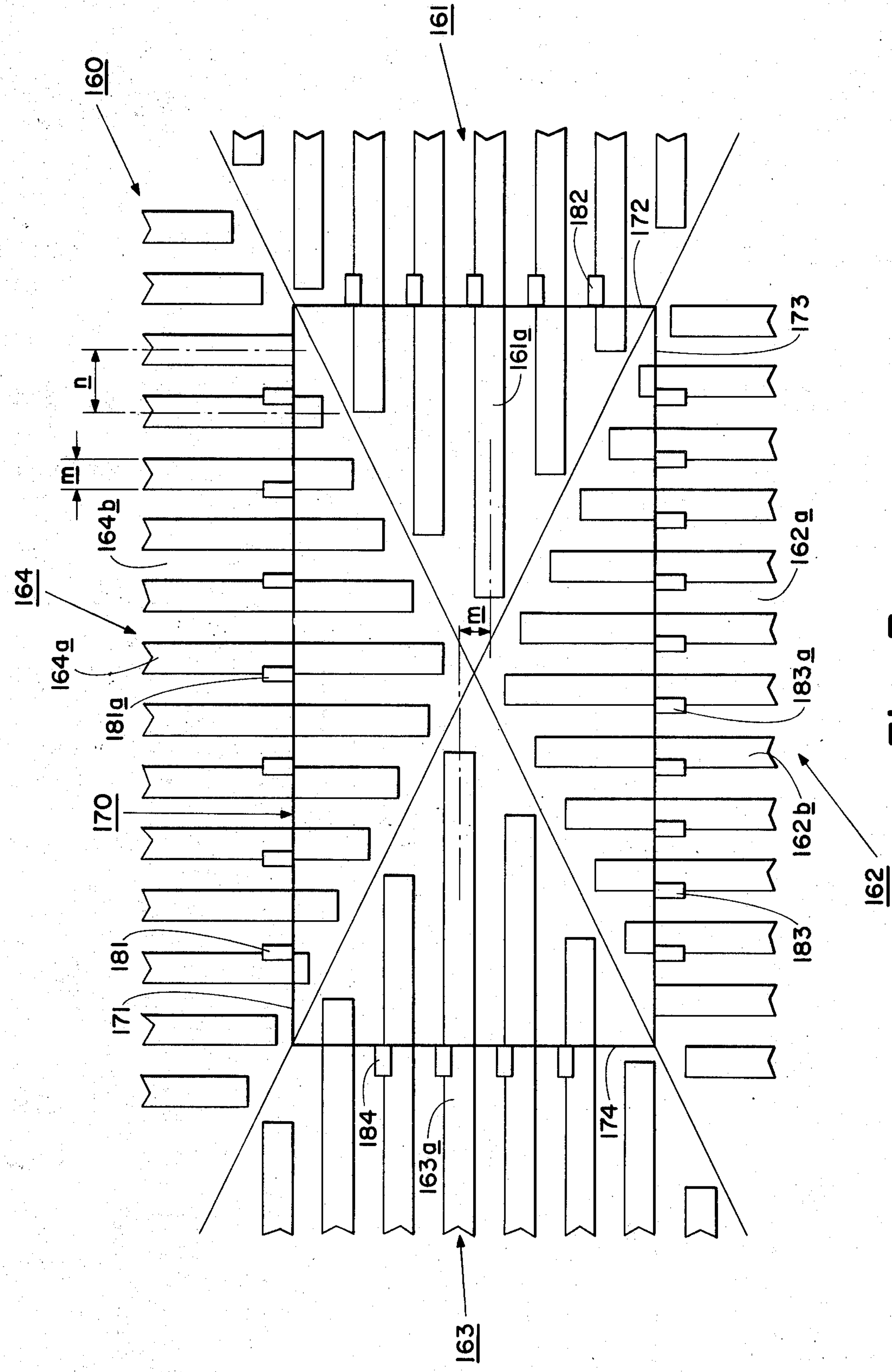
FIGS. 7 to 12 inclusive are plan views of lead structures according to further embodiments of the invention.

Now turning to the further aspects of the invention wherein the lead thickness is considered as a significant factor, and referring to FIG. 7, the lead structure 160 is shown as having four lead sets 161, 162, 163, and 164 respectively, the lead with being $m$ approximately half the center-to-center lead spacing $n$ in each set. The central leads 161$a$ and 163$a$ of lead sets 161 and 163 respectively are not on the same center line but their center-lines are spaced by approximately $m$ units, as shown. Similarly, the center-lines of leads 162$a$ and 164$a$—which are the central leads of lead sets 162 and 164 respectively—are spaced by approximately $m$ units. Now consider the left hand edge of each lead 162 and 164 in the drawing as the trailing edge of the lead and the right hand edge as the leading edge. A chip is now placed symmetrically upon the lead structure as shown in the drawing. The chip 170 has sides 171, 172, 173 and 174 having contacts 181, 182, 183 and 184 therealong respectively. Let it be assumed that each contact is extremely narrow and that the contact center-line must align with part of a contact for registry to occur. Now consider contact 181$a$ which is the central contact along the side 171, falling upon the center-line of the side 181. This contact is shown falling upon the leading edge of the leads 164$a$. If the contact falls any further to the left in the drawing, registry with the lead 164$a$ is lost and bonding of the contact to the lead cannot be effected. However, the contact could be shifted towards the trailing edge of the lead 164$a$, the maximum amount of such shift being $m$ units, before the contact moves out of registry with the trailing edge of the lead. If the contact is now shifted to the right by $2m$ units, it falls into registry with the leading edge of the next lead 164$b$ and may again be shifted further by $m$ units until registry is again lost. Thus, measuring the permissable shift from the center-line of the side 181, the contact 181$a$ maintains registry with a lead 164 if the shift to the right is from 0 to $m$ units, from $2m$ to $3m$ units, $4m$ to $5m$ units, etc.

Considering now the contacts 183 along the side 173 of the chip, it will be seen that as the number of contacts arranged symmetrically along the side 173 is even, there is no contact upon the center-line of side 173, but that the contact 183$a$ is displaced to the left thereof by half the contact spacing. Since, in this case, the contact spacing is $n$ units—i.e. $2m$ units—the contact 183$a$ is displaced to the left of the center-line of side 173 by $m$ units and registers with the leading edge of contact 162$a$.

If the contact 142$a$ is shifted further to the left away from the center-line of side 173 and thus further displaced laterally from contact 183$a$, it passes out of registry with the lead 183$a$ and does not fall into registry with the next lead 162$b$ until a shift of $m$ units has occurred. Thus, the contact 183$a$ maintains registry with a lead 162 at displacements from the center-line of side 173 of $m$ to $2m$ units, $3m$ to $4m$ units, $5m$ to $6m$ units, etc. Now, it will be seen that the contacts 181$a$ and 183$a$ can be relatively displaced laterally along the chip sides by 0 to $2m$ units, $2m$ to $4m$ units, $4m$ to $6m$ units, etc.—i.e. by any amount, whilst still being capable of registration with the leads of the lead structure by appropriate placement of the chip thereupon. The same relationship obviously exists between the opposed contact rows 182 and 184.

Referring again to FIG. 7, a further advantage of having relatively wide leads at relatively small center-to-center spacing is demonstrated. In the foregoing description previous to FIG. 7, for the sake of simplicity, the requirement has been stipulated that a lead set of given lead spacing will accommodate contact rows of the same spacing or multiples thereof. This must always be true, of course, if the contacts are to fall squarely upon the center-lines of the leads. However, FIG. 7 demonstrates that registry with the center-lines of the leads is not necessary and that the contacts may be shifted to one side or the other of the lead center-line by as much as $m/2$ units whilst maintaining registry with the leads, assuming that at least half of the contact registers with the lead for bonding. In FIG. 7, contacts 182, 183 and 184 are spaced by $n$ units, but contacts 181 are spaced by $\frac{3}{2}n$ units. Since $n=2m$, this spacing is also expressed as $3m$ units, and it is therefore apparent that in the kind of situation existing in FIG. 7, both the leading edge and the trailing edge of each lead may be considered as a separate lead center-line for the purpose of considering contact spacing. Therefore, where the lead spacing is approximately double the lead width, the requirement for contact spacing is that it be a multiple of the lead width, although that multiple clearly cannot be one.

Figure 8:
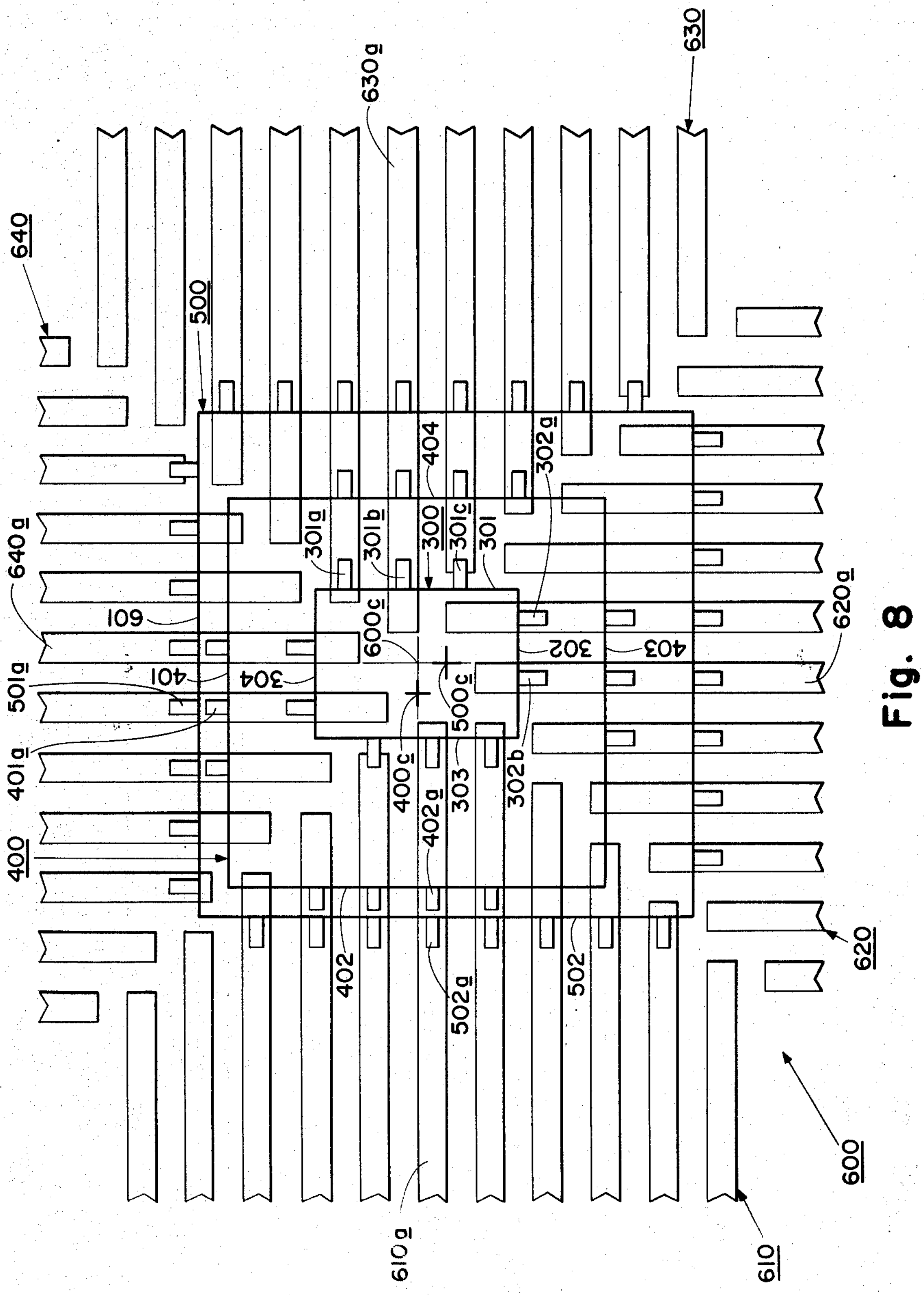

FIG. 8 shows a lead structure 600 according to the present invention and designed to accept chips manufactured to existing EIA (Electronic Industries Association) standards. The lead structure has lead sets 610, 620, 630, and 640, 5 mils wide and center-to-center spaced by 10 mils and is designed to accept chips conforming to EIA JC11.4 standards. All chips conforming to these standards are rectangular and have contact positions specified as follows:

On chip sides having an even number of contacts, the center-line of the contact closest to the center-line of that side in a counterclockwise direction is displaced therefrom by 7.5 mils; and On chip sides having an odd number of contacts, the center-line of the contact closest to the center-line of that side in counterclockwise direction is displaced therefrom by 2.5 mils.

These standards are predicated upon the maximum number of contacts having 10 mil spacings which can be formed along a chip side whilst conforming to the conditions specified above.

For example, take a chip side 40 mils long and marked in 0.5 mil divisions from 0- to 40-mil along the edge. If a given contact is placed 2.5 mils to one side of the chip side center-line, then, with 10 mil contact spacing, contacts will be located at the 22.5 mil mark and at the 32.5 mil, 12.5 mil and 2.5 mil marks. Therefore, a maximum of four contacts can be realized. Now place the same given contact 7.5 mils to one side of the chip side center-line. Contacts can now be located at the 27.5 mil mark and at the 37.5 mil, 17.5 mil and 7.5 mil marks, thus still giving a maximum of four contacts. Since in either of the above cases, the maximum number of available contacts is four, which is even, the arranged used to conform to the EIA standard is the second—i.e. with the said given contact displaced from the side center-line by 7.5 mils in the counterclockwise direction.

A further important point is that the maximum available number of contacts need not be actually present—any one or more of the contacts may be absent, but the standards are predicated upon the maximum number available.

To accept chips formed according to these standards, the center leads 610*a* and 630*a* of the lead sets 610 and 630 respectively are each displaced from the center line of the lead structure parallel thereto by 2.5 mils in clockwise direction and the center leads 620*a* and 640*a* of the lead sets 620 and 640, respectively, are each displaced from the center line of the lead structure parallel thereto by 2.5 mils in counterclockwise direction.

Three chips are shown in the respective positions which they would occupy upon the lead structure. Chip 300 is constructed according to EIA standard JC11.4–22 and is of rectangular configuration having adjacent sides 301 and 302 of lengths 35 mils and 25 mils respectively. Three contacts 301*a*, 301*b*, and 301*c* are provided at 10 mils center-to-center spacings along the side 301, the center contact 301*b* being offset from the center line of the chip side by 2.5 mils in counterclockwise direction. The side 302 has two contacts 302*a* and 302*b* center-to-center spaced by 10 mils, the contact 302*a* being displaced counterclockwise from the center-line of the side 302 by 7.5 mils. Sides 303 and 304 are identical to sides 301 and 302, respectively, as shown.

Chip 400 is constructed to EIA standard JC11.4–5, and is a square of 65 mils side length. Side 401 has three contacts therealong at 10 mils center-to-center spacing, contact 401*a* being displaced from the center-line of side 401 by 7.5 mils (this is because although only three contacts are used, the maximum number which could be placed along the side 401 is six.) Side 402 has four contacts therealong at 10 mils spacings, contact 402*a* being displaced from the center-line of side 402 by 2.5 mils. Sides 403 and 404 are identical to sides 401 and 402 respectively. Now, because contact 401*a* is displaced to the left of the center-line of side 401 in the drawings and the lead 640*a* is displaced to the right of the lead structure center-line, the chip cannot be placed centrally of the lead structure, but instead must be placed with its center point 400*c* 5 mils to the left of the lead-structure center point 600C.

Finally, in connection with FIG. 8, there is shown a square chip 500 having a center point 500*c* and a side length of 85 mils. The chip is constructed to EIA standard JC11.4–9, and has along each side eight contacts center-to-center spaced by 10 mils. On side 501 contact 501*a* is displaced counterclockwise from the center-line of that side by 7.5 mils. On side 502, contact 502*a* is displaced counterclockwise from the center-line of side 502 by 7.5 mils. Sides 503 and 504 are identical to sides 501 and 502 respectively. Since the lead 610*a* is the lead set 610 is displaced downwardly in the drawing from the lead structure center-point 600*c*, the chip 500 must be placed upon the lead structure with its center-point 500*c* displaced downwardly in the drawing from the lead-structure center-point 5 mils if the chip contacts are to align with their respective leads.

Figure 9:
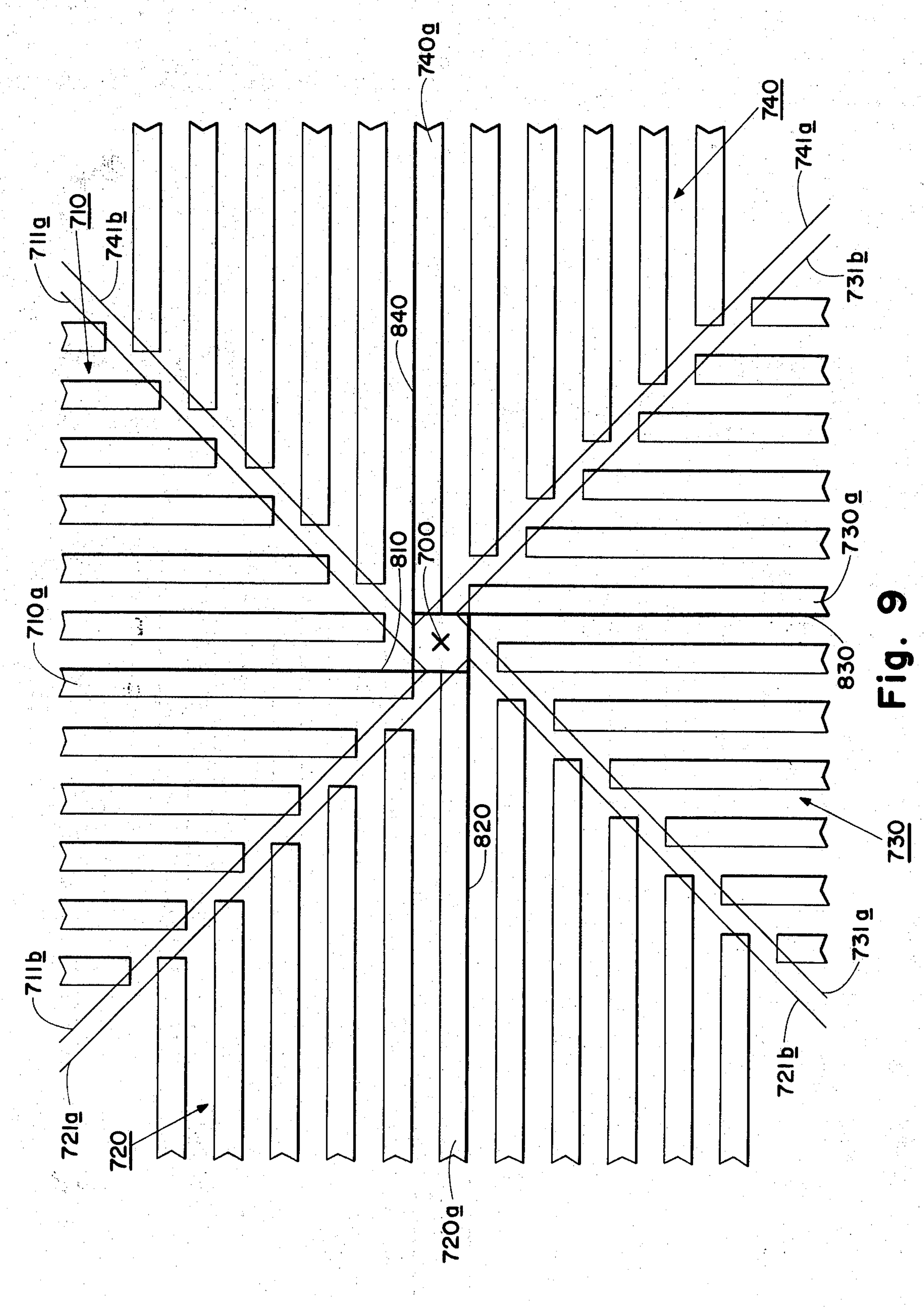

Turning now to FIG. 9, a lead structure according to the invention and similar to that shown in FIG. 8 is shown without devices superimposed thereupon. The lead structure consists of lead sets 710, 720, 730 and 740, each such lead set having loci 711*a*, 711*b*, 721*a*, 721*b*, 731*a*, 731*b*, and 741*a* and 741*b* respectively drawn through the center points of the lead ends (the lead ends are again squared off, as shown in the drawing). Each lead in the lead structure is $f$ units wide and center-to-center spaced from each adjacent lead by $2f$ units. Each pair of intersecting loci—for example 711*a* and 711*b*—subtends an angle of 90°. The center line of each lead set bisects the angle between the loci of that set giving center-lines 810, 820, 830 and 840 for the lead sets 710, 720, 730 and 740, respectively. Now it may be seen from the drawing that the following relationships exist:

Line 810 is parallel to and spaced from line 830 by $2f$ units;

Line 820 is parallel to and spaced from line 840 by $2f$ units;

Therefore, the center-lines may be extended to form a square, the center-point of which is the center-point 700 of the lead structure.

Also, center-lines 810 and 830 have a lead 710*a* and 730*a* respectively on the counterclockwise side thereof, one edge of each such lead coinciding with the adjacent center-line. Similarly, center-lines 820 and 840 have a lead 720*a* and 740*a* respectively on the clockwise side thereof, one edge of each such lead coinciding with the adjacent center-line.

Now, it may be seen that each lead set may be moved towards and away from the center-point 700 of the lead structure along the center-line of the lead set. The further away from the center-point 700 the lead sets are placed, then the greater will be the minimum size of device which can be accommodated. Therefore, it is preferable to have the lead sets close to the center, as shown in the drawing.

In the embodiment of FIG. 9, it may be seen that:

the end of lead 720*a* is co-linear with line 810;
the end of lead 730*a* is co-linear with line 820;
the end of lead 740*a* is co-linear with line 830; and
the end of lead 710*a* is co-linear with line 840.

This arrangement gives the closest practicable bunching of the leadsets—and therefore the maximum versatility of the total structure—whilst keeping adjacent leads and lead ends sufficiently far apart for manufacturing and operating tolerances.

Figure 10:
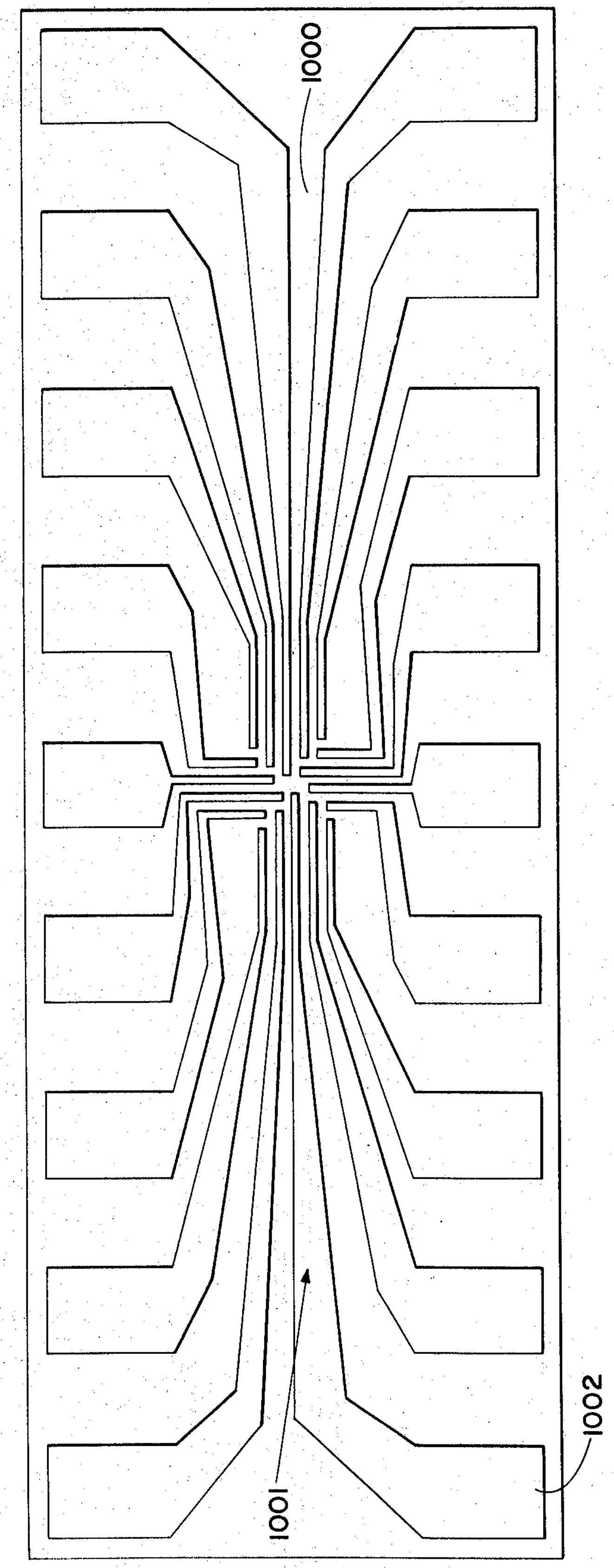
Figure 11:
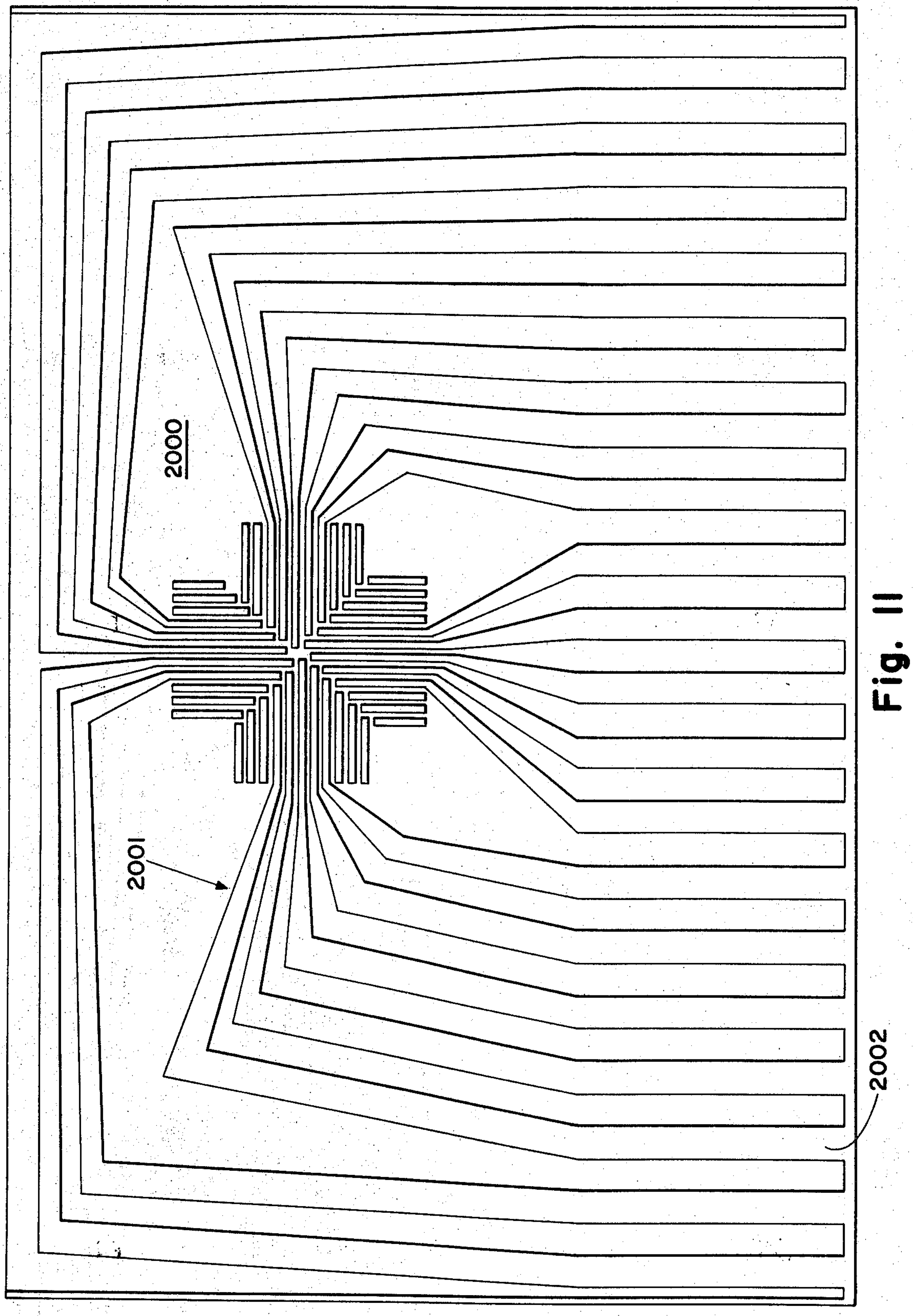
Figure 12:
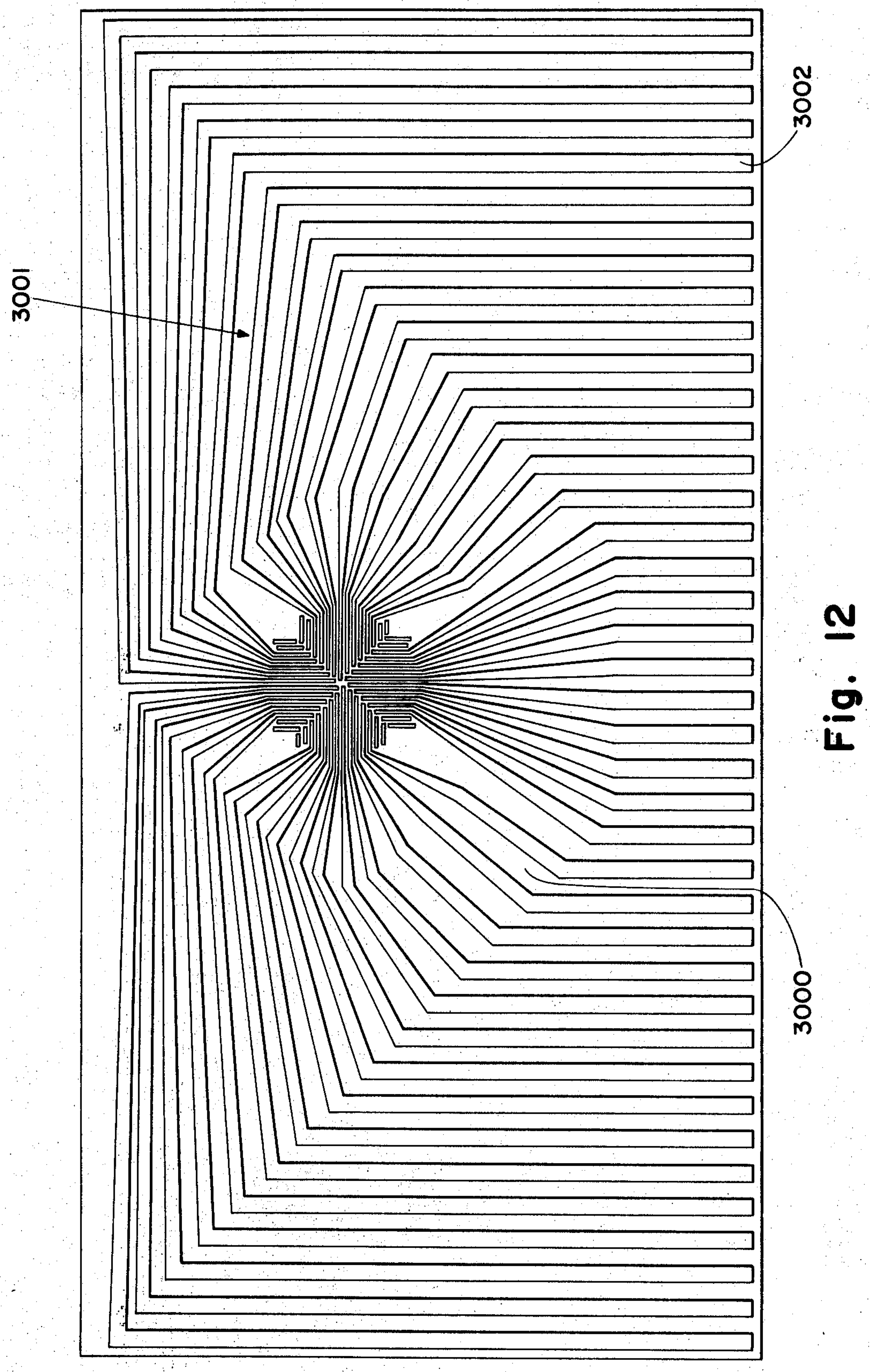

FIGS. 10, 11 and 12 show various interconnect patterns using the lead structure of FIG. 9. FIG. 10 shows a ceramic substrate 1000 having a lead pattern 1001 screened thereupon. The center of the pattern is formed as aforesaid in the general pattern of FIG. 9, each lead set of one opposed pair having five leads and each lead set of the other opposed pair having four leads. The leads radiate outwards from the central lead structure to terminate in nine connection points 1002 along each side of the substrate. The central lead structure, being suitable to that of FIG. 8, is such that the substrate 1000 can accept either of the chips 300 or 400 of FIG. 8 which conform to EIA standards JC11.4–22 and JC11.4–5 respectively. The substrate 1000 is, of course, suitable for fabrication of a flat-pack or dual in-line package.

FIG. 11 shows a substrate 2000 having an interconnect pattern 2001 screened thereupon, the substrate being suitable for fabrication of an edge interconnect package. The central lead structure pattern again follows the pattern of FIG. 9 but now has 20 leads extending therefrom—five from each lead set. These leads terminate in connection points 2002 along one edge of the substrate. This pattern again would accept either of the EIA standard chips 300 and 400 of FIG. 8.

FIG. 12 shows another substrate 3000 suitable for fabrication of an edge interconnection package. The substrate has a lead pattern 3001 screened thereupon, the central lead structure being similar to that of FIG. 9 and the lead pattern terminating in interconnection points 3002 along one edge of the substrate. In this case, the central lead structure is composed of four lead sets, each having ten leads and therefore will accommodate, as well as the chips 300 and 400 of FIG. 8, the chip 500, which has the EIA designation JC11.4–9.

As well as the EIA standard chips specifically mentioned, the lead patterns 1001, 2001 and 3001 will, of course accommodate any other chip configurations conforming to the lead spacings and maximum number of contacts possible hereinbefore discussed.

Finally, as well as using a lead pattern deposited upon a substrate, a beam lead frame can equally well be manufactured to give the structure of the invention using well known manufacturing techniques.

It will be appreciated that numerous other embodiments of the present invention are possible and will be apparent to those skilled in the art without departing from the spirit and scope of the disclosure and the claims appended hereto.

What is claimed is:

1. An interconnection structure adapted to accommodate in electrical interconnection therewith substantially planar polygonal microelectronic devices having $n$ sides subtending angles $q_1$, $q_2$ . . . $q_n$, the first and second sides subtending the angle $q_1$, the second and third sides subtending the angle $q_2$ . . . and the $n$th side and the first side subtending the angle $q_n$, at least said first and second sides having contacts therealong, the first said side having said contacts at center-to-center spacing of $s_1$ units or multiples thereof, the second adjacent said side having said contacts at center-to-center spacings of $s_2$ units or multiples thereof . . . and the $n$th said side having contacts therealong, said contacts being at center-to-center spacings of $s_n$ units or multiples thereof, said interconnection structure comprising at least as many coplanar conductor sets as ther are sides of each said device having contacts to be accommodated, each said conductor set comprising a plurality of coplanar parallel conductors, each said conductor having inner and outer ends, and where the number of conductor sets is two, the locus of said inner ends of each said set being a generally straight line, the locus of said inner ends of the first said conductor set being generally parallel to and adjacent the locus of the inner ends of the second said conductor set, and where the number of conductor sets is three or more, the loci of said inner ends of the first said conductor set forming first and second generally straight lines, the loci of said inner ends of the second said conductor set adjacent the first said conductor set forming third and fourth generally straight lines, said second and third generally straight lines being generally parallel and coadjacent . . . and the loci of said inner ends of the $n$th said conductor set adjacent the first said conductor set designated respectively locus number $(2n-1)$ and locus number $2n$ each forming a generally straight line, locus number $2n$ being generally parallel and adjacent said first generally straight line forming a locus of the inner ends of said first conductor set, the angle subtended by said conductor of said first and second conductor sets being the complementary angle to the angle $q_1$, the angle subtended by said second and third conductor sets being the complementary angle to the angle $q_2$ . . . and the angle subtended by said conductors of the $n$th and first conductor sets being the complementary angle to the angle $q_n$, and the conductors of said first conductor set being center-to-center spaced by $s_1$ units or sub-multiples thereof, the conductors of said second conductor set being center-to-center spaced by $s_2$ units or sub-multiples thereof . . . and the conductors of said $n$th conductor set being spaced by $s_n$ units or sub-multiples thereof.

2. The structure of claim 1 wherein the integer $n$ is four and each of said angles $q_1$, $q_2$ . . . $q_n$ is a right angle.

3. The structure of claim 2 wherein the conductors of all said conductor sets are equally spaced.

4. The structure of claim 3 wherein said conductors of each of said conductor sets are center-to-center spaced by twice the width of said conductors.

5. The structure of claim 4 wherein said conductors are squared off at their inner ends and the loci of each conductor set are drawn through the mid-points of said inner ends of said conductors and meet to subtend a right angle, said lead structure having a central area bounded by said meeting points of said loci, said central area containing the centerpoint of a square, each side of said square passing through or being capable of being extended to pass through a meeting point of said loci and bisecting the angle subtended thereby.

6. The structure of claim 5 wherein said meeting points of said loci are symmetrically located about said center-point of said square.

7. The structure of claim 6 wherein the line through each loci meeting point bisecting the angle subtended by said respective loci lies on the line delineated by one side of a conductor within the conductor set containing said respective loci, said conductor having its inner end closer to said meeting point of said loci than any other conductor in said conductor set, the other side of said conductor lying in a line passing through the center point of said square, and the squared-off inner end thereof lying on a side of said square.

8. The structure of claim 1 having at least first, second and third conductor sets having conductors spaced center-to-center by $s_1$, $s_2$ and $s_3$ units respectively or sub-multiples thereof, the first and second said sets subtending the complementary angle to the angle $q_1$ between the conductors thereof and said second and third sets subtending the complementary angle $q_2$ between the conductors thereof, said structure adapted to accommodate in electrical interconnection therewith at least first and second substantially planar polygonal devices, each having at least three sides with contacts therealong, and each of said devices having its first side with contacts therealong at center-to-center spacings of $s_1$ units or multiples thereof, its second side adjacent said first side having contacts therealong at center-to-center spacings of $s_2$ units or multiples thereof and its third side adjacent said second side having contacts therealong at center-to-center spacings of $s_3$ units or multiples thereof, said first and second sides subtending the angle $q_1$ and said second and third sides subtending the angle $q_2$, said first device being registrable with said conductor structure such that a contact upon said first side of said first device and located $t_1$ units from the corner of said first device containing said angle $q_1$ is registrable with a first conductor of said first conductor set, a contact upon the second side of said first device and located $u_3$ units from said corner containing said angle $q_1$ is registrable with a first conductor of said second conductor set, a contact upon said second side of said first device and located $u_1$ units from the corner of said first device containing the angle $q_2$ is registrable with a second conductor of said second conductor set and a contact upon the third side of said first device and located $z_1$ units from said second corner of said first device is registrable with a first conductor of said third conductor set, said second device being registrable with said conductor structure such that a contact upon said first side of said second device and located $t_2$ units from the corner of said second device containing said angle $q_1$ is registrable with said first conductor of said first conductor set, a contact upon the second side of said second device and located $u_4$ units from said corner containing said angle $q_1$ is registrable with said first conductor of said second conductor set, a contact upon said second side of said second device and located $u_2$ units from the corner of said second device containing the angle $q_2$ is registrable with said second conductor of said second conductor set and a contact upon the third side of said second device anl located $z_2$ units from said second corner of said second device is registrable with said first conductor of said third conductor set, said distances $u_1$, $u_2$, $u_3$, $u_4$ and $t_1$, $t_2$, and $z_1$, $z_2$ and said angles $q_1$ and $q_2$ satisfying the relationship $$(u_2-u_1)^2+(t_2-t_1)^2+[(u_4-u_3)\sin.q_1+d_1.\cos.q_1]^2 =(u_4-u_3)^2+(z_2-z_1)^2+[(u_2-u_1)\sin.q_2+d_1.\cos.q_2]^2$$

wherein $d_1$ is the lateral distance between the positions of said first sides of said first and second devices when positioned upon said structure in registry therewith as aforesaid.

9. The interconnection structure of claim 1 wherein said structure is a lead pattern deposited upon a substrate and adapted to accommodate beam-lead devices.

10. The interconnection structure of claim 1 wherein said interconnection structure is a beam lead frame.

11. The interconnection structure of claim 7 wherein said structure is a lead pattern deposited upon a substrate and adapted to accommodate beam-lead devices.

12. The interconnection structure of claim 7 wherein said structure is a beam lead frame.

References Cited

UNITED STATES PATENTS

| | | | |
|---|---|---|---|
| 3,405,224 | 10/1968 | Yawata et al. | 29—627 |
| 3,484,534 | 12/1969 | Kilby et al. | 317—101 A |
| 3,659,035 | 4/1972 | Planzo | 317—101 A |

DAVID SMITH, Jr., Primary Examiner

U.S. Cl. X.R.

174—68.5; 317—234